United States Patent
Ute et al.

(10) Patent No.: US 10,711,081 B2
(45) Date of Patent: Jul. 14, 2020

(54) VINYL ALCOHOL-VINYL ACETATE COPOLYMER

(71) Applicants: TOKUSHIMA UNIVERSITY, Tokushima (JP); SEKISUI CHEMICAL CO., LTD., Osaka (JP)

(72) Inventors: Koichi Ute, Tokushima (JP); Tomohiro Hirano, Tokushima (JP); Miyuki Oshimura, Tokushima (JP); Yasunari Kusaka, Osaka (JP)

(73) Assignees: TOKUSHIMA UNIVERSITY, Tokushima (JP); SEKISUI CHEMICAL CO., LTD., Osaka (JP)

(*) Notice: Subject to any disclaimer, the term of this patent is extended or adjusted under 35 U.S.C. 154(b) by 56 days.

(21) Appl. No.: 16/098,478

(22) PCT Filed: May 8, 2017

(86) PCT No.: PCT/JP2017/017409
§ 371 (c)(1),
(2) Date: Nov. 2, 2018

(87) PCT Pub. No.: WO2017/195735
PCT Pub. Date: Nov. 16, 2017

(65) Prior Publication Data
US 2019/0153136 A1 May 23, 2019

(30) Foreign Application Priority Data

May 9, 2016 (JP) .................................. 2016-094067
Aug. 23, 2016 (JP) .................................. 2016-163058

(51) Int. Cl.
*C08F 216/06* (2006.01)
*C08F 218/08* (2006.01)
*C08F 8/14* (2006.01)
*C08F 216/38* (2006.01)
*C08F 8/12* (2006.01)
*B01J 31/12* (2006.01)

(52) U.S. Cl.
CPC .......... *C08F 216/38* (2013.01); *B01J 31/122* (2013.01); *C08F 8/12* (2013.01); *C08F 8/14* (2013.01); *C08F 216/06* (2013.01); *C08F 218/08* (2013.01); *B01J 2231/49* (2013.01); *B01J 2531/26* (2013.01); *C08F 2800/10* (2013.01); *C08F 2810/00* (2013.01)

(58) Field of Classification Search
CPC ..... C08F 16/06; C08F 218/08; B01J 2231/49; B01J 2531/26
See application file for complete search history.

(56) References Cited

FOREIGN PATENT DOCUMENTS

| EP | 0 450 317 | 10/1991 |
|----|-----------|---------|
| JP | 62-241865 | 10/1987 |
| JP | 2-153960 | 6/1990 |
| JP | 6-234899 | 8/1994 |
| JP | 7-114005 | 5/1995 |
| JP | 9-67441 | 3/1997 |
| JP | 2016-47799 | 4/2016 |

OTHER PUBLICATIONS

Extended European Search Report dated Nov. 29, 2019 in corresponding European Application No. 17796096.0.
Toppet et al., "Nuclear magnetic resonance studies on sequence distributions in vinyl alcohol-vinyl acetate copolymers", Polymer, May 1983, vol. 24, pp. 507-512.
Oshimura et al., "Efficient acylation and transesterification catalyzed by dilithium tetra-tert-butylzincate at low temperatures", Tetrahedron Letters, vol. 57, 2016 pp. 2070-2073.
International Search Report dated Aug. 1, 2017 in International (PCT) Application No. PCT/JP2017/017409.
Ilyin et al., "Effect of Chain Structure on the Rheological Properties of Vinyl Acetate-Vinyl Alcohol Copolymers in Solution and Bulk", Macromolecules, vol. 47, 2014, pp. 4790-4804.
Denisova et al., "Chain Statistics in Vinyl Acetate-Vinyl Alcohol Multiblock Copolymers", Polymer Science, vol. 54, Nos. 7-8, 2012, pp. 375-382.

*Primary Examiner* — Jeffrey C Mullis
(74) *Attorney, Agent, or Firm* — Wenderoth, Lind & Ponack, L.L.P.

(57) ABSTRACT

The present invention provides a vinyl alcohol-vinyl acetate copolymer having excellent solubility and a method for producing a vinyl alcohol-vinyl acetate copolymer. Provided is a vinyl alcohol-vinyl acetate copolymer including a unit of vinyl alcohol and a unit of vinyl acetate, the vinyl alcohol-vinyl acetate copolymer having a randomness value R of 0.5 or higher, the randomness value R being obtained using the following equation (1):

$$R = \frac{1}{L_A} + \frac{1}{L_O} \tag{1}$$

where $L_O$ represents a mean chain length of the unit of vinyl alcohol and $L_A$ represents a mean chain length of the unit of vinyl acetate.

10 Claims, No Drawings

VINYL ALCOHOL-VINYL ACETATE COPOLYMER

TECHNICAL FIELD

The present invention relates to a vinyl alcohol-vinyl acetate copolymer having excellent solubility and a method for producing a vinyl alcohol-vinyl acetate copolymer.

BACKGROUND ART

Vinyl alcohol-vinyl acetate copolymers are used in many fields such as fiber processing, paper processing, films, and adhesives, as well as dispersants and binders. Vinyl alcohol-vinyl acetate copolymers are commonly obtained by direct saponification of a polyvinyl ester polymer such as polyvinyl acetate with an alkali or an acid. In saponification using an alkali, the saponification reaction is stopped using an acid. In saponification using an acid, the saponification reaction is stopped using an alkali. Patent Literature 1, for example, discloses a method in which a colloidal solution of silicic anhydride is added after saponification using an alkali or an acid.

However, vinyl alcohol-vinyl acetate copolymers obtained by a conventional method have poor solubility in a solvent, and problematically fail to provide a desired effect, in particular, when used together with an aqueous solvent.

CITATION LIST

Patent Literature

Patent Literature 1: JP H09-067441 A

SUMMARY OF INVENTION

Technical Problem

The present invention aims to provide a vinyl alcohol-vinyl acetate copolymer having excellent solubility and a method for producing a vinyl alcohol-vinyl acetate copolymer.

Solution to Problem

The present invention relates to a vinyl alcohol-vinyl acetate copolymer including a unit of vinyl alcohol and a unit of vinyl acetate, the vinyl alcohol-vinyl acetate copolymer having a randomness value R of 0.5 or higher, the randomness value R being obtained using the following equation (1) where $L_O$ represents a mean chain length of the unit of vinyl alcohol and $L_A$ represents a mean chain length of the unit of vinyl acetate.

The present invention is specifically described in the following.

$$R = \frac{1}{L_A} + \frac{1}{L_O} \quad (1)$$

The present inventors found out that the monomer chain structure in a vinyl alcohol-vinyl acetate copolymer is associated with the improvement of the properties of the copolymer.

As a result of further intensive studies, the present inventors found out that a vinyl alcohol-vinyl acetate copolymer having high solubility can be obtained by setting the randomness value obtained from the mean chain length of the respective units within a predetermined range. Thus, the present invention was completed.

In particular, in the case of the vinyl alcohol-vinyl acetate copolymer of the present invention, since the lower critical solution temperature (LCST) can be shifted to a higher temperature region, dissolution at a higher temperature or suppression of gel formation can be enabled, which allows the vinyl alcohol-vinyl acetate copolymer of the present invention to be used for a wider variety of applications.

When the vinyl alcohol unit has higher block properties, a hydrogen-bonded structure is formed between molecules or in a molecule, problematically leading to reduction in solubility or gel formation. In the case of the vinyl alcohol-vinyl acetate copolymer of the present invention, however, the whole polymer chain has a random structure to realize high solubility, as well as effective suppression of gel formation.

The vinyl alcohol-vinyl acetate copolymer of the present invention has a unit of vinyl alcohol and a unit of vinyl acetate:

The terms "unit of vinyl alcohol" and "unit of vinyl acetate" as used herein refer to "vinyl alcohol" and "vinyl acetate" present in the vinyl alcohol-vinyl acetate copolymer, respectively.

The vinyl alcohol-vinyl acetate copolymer of the present invention has a randomness value (mean persistence ratio) R of 0.5 or higher. The randomness value R is obtained using the following equation (1) where $L_O$ represents the mean chain length of the unit of vinyl alcohol and $L_A$ represents the mean chain lengths of the unit of vinyl acetate.

The randomness value R is a criterion for determining whether the whole polymer chain has a block structure or a random structure. When the randomness value R is 0, the whole polymer chain has a block structure. When the randomness value R is 1, the whole polymer chain has a random structure.

When the randomness value R is 2, the unit of vinyl alcohol and the unit of vinyl acetate coexist alternately in a molecule.

Since the randomness value R is 0.5 or higher in the present invention, the polyvinyl alcohol-vinyl acetate copolymer of the present invention is considered to be a resin excellent in solubility. The randomness value R is preferably 0.6 or higher, more preferably 0.9 or higher, while preferably 2 or lower.

$$R = \frac{1}{L_A} + \frac{1}{L_O} \quad (1)$$

In the vinyl alcohol-vinyl acetate copolymer of the present invention, the unit of vinyl alcohol has a mean chain length $L_O$ of preferably 1 or longer, more preferably 1.5 or longer, still more preferably 2.0 or longer.

A preferable upper limit thereof depends on the amount of the unit of vinyl alcohol. In the case where the amount of the unit of vinyl alcohol is smaller than the amount of the unit of vinyl acetate, the mean chain length $L_O$ is preferably 6 or shorter.

The "mean chain length $L_O$ of the unit of vinyl alcohol" as used herein can be calculated using the following equation (3).

In the equation (3), "I" represents the strength obtained by $^1$H-NMR. Symbols "AAA, AAO, OAO, AOA, AOO, and OOO" represent triads classified into "vinyl alcohol-centered triads" including "AOA, AOO, and OOO" and "vinyl acetate-centered triads" including "AAA, AAO, and OAO" when the vinyl alcohol-vinyl acetate copolymer of the present invention is divided by triads including the unit of vinyl alcohol (hereafter, also simply referred to as O) and/or the unit of vinyl acetate (hereafter, also simply referred to as A). It is to be noted that "AOO" and "OOA" are both represented as "AOO", and "AAO" and "OAA" are both represented as "AAO". Specifically, "$I_{OOO}$" represents the "strength of OOO measured by $^1$H-NMR".

$$L_O = \frac{I_{OOO} + I_{AOO} + I_{AOA}}{I_{AOA} + I_{AOO}/2} \quad (3)$$

In the vinyl alcohol-vinyl acetate copolymer of the present invention, the mean chain length $L_A$ of the unit of vinyl acetate is preferably 1 or longer, more preferably 1.2 or longer, still more preferably 1.5 or longer. A preferable upper limit thereof depends on the amount of the unit of vinyl acetate. In the case where the amount of the unit of vinyl acetate is smaller than the amount of the unit of vinyl alcohol, the mean chain length $L_A$ of the unit of vinyl acetate is preferably 6 or shorter.

The "mean chain length $L_A$ of the unit of vinyl acetate" as used herein can be calculated using the following equation (4).

$$L_A = \frac{I_{AAA} + I_{AAO} + I_{OAO}}{I_{OAO} + I_{AAO}/2} \quad (4)$$

In the vinyl alcohol-vinyl acetate copolymer of the present invention, the proportion of the amount of the triad OOO in the total amount of the vinyl alcohol-centered triads (AOA, AOO, and OOO) is preferably 70% or less. With the proportion within the above range, the unit of vinyl alcohol having a block structure is reduced, resulting in suppression of gel formation as well as enhancement of the solubility at a higher temperature.

In the vinyl alcohol-vinyl acetate copolymer of the present invention, the proportion of the amount of the triad AAA in the total amount of the vinyl acetate-centered triads (AAA, AAO, and OAO) is preferably 70% or less. With the proportion within the above range, the unit of vinyl acetate having a block structure is reduced, resulting in suppression of gel formation as well as enhancement of the solubility at a higher temperature.

In addition, the smaller of the proportion of the triad OOO and the proportion of the triad AAA is preferably 50% or less.

The lower limit of the amount of the unit of vinyl alcohol in the vinyl alcohol-vinyl acetate copolymer of the present invention is preferably 0.2 mol % and the upper limit thereof is preferably 99.8 mol %. With the amount of the unit of vinyl alcohol within such a range, the function of the hydroxyl group that the vinyl alcohol possesses can be imparted to a vinyl alcohol-vinyl acetate copolymer molecule, enabling control of the solubility in water or a solvent. The lower limit of the amount of the unit of vinyl alcohol is more preferably 50 mol % and the upper limit thereof is more preferably 98 mol %.

The lower limit of the amount of the unit of vinyl acetate in the vinyl alcohol-vinyl acetate copolymer of the present invention is preferably 0.2 mol % and the upper limit thereof is preferably 99.8 mol %. With the amount of the unit of vinyl acetate within such a range, the function of the hydroxyl group in the vinyl alcohol can be imparted to a vinyl alcohol-vinyl acetate copolymer molecule, enabling control of the solubility in water or a solvent. The lower limit of the amount of the unit of vinyl acetate is more preferably 2 mol % and the upper limit thereof is more preferably 50 mol %.

In the vinyl alcohol-vinyl acetate copolymer of the present invention, the product of the amount of the unit of vinyl acetate (Vac content) and the mean chain length $L_A$ (Vac content×mean chain length $L_A$×0.01, hereafter, also referred to as acetyl chain ratio) is preferably 2.5 or less, more preferably 1.0 or less, still more preferably 0.25 or less. With the acetyl chain ratio within the above range, excellent solubility and suppression of gel formation can be both achieved.

The molecular weight of the vinyl alcohol-vinyl acetate copolymer of the present invention is not particularly limited. Preferably, the number average molecular weight is 1,000 to 1,000,000.

The vinyl alcohol-vinyl acetate copolymer of the present invention may have a unit of a different monomer.

The different monomer is not particularly limited. Preferably, it is a monomer having at least one polar group selected from the group consisting of carboxyl, hydroxyl, amide, amino, epoxy, and ether groups and one olefinic double bond. Examples of such a monomer include crotonic acid, maleic acid, fumaric acid, citraconic acid, mesaconic acid, itaconic acid, allyl alcohol, vinyl ether, and allylamine.

The amount of the unit of a different monomer in the vinyl alcohol-vinyl acetate copolymer of the present invention is determined according to the intended use and therefore is not particularly limited. The amount of the unit of a different monomer is preferably 20% by weight or less, more preferably 10% by weight or less, still more preferably 5% by weight or less, relative to the whole vinyl alcohol-vinyl acetate copolymer.

The vinyl alcohol-vinyl acetate copolymer of the present invention is preferably produced by, for example, a method including the step of transesterification of polyvinyl acetate or a raw material vinyl alcohol-vinyl acetate copolymer using a dianionic zincate complex represented by the following formula (2) (transesterification method). The present invention also encompasses such a method for producing the vinyl alcohol-vinyl acetate copolymer.

The vinyl alcohol-vinyl acetate copolymer of the present invention may also be produced by reacetylating polyvinyl alcohol (reacetylation method).

The method for producing the vinyl alcohol-vinyl acetate copolymer of the present invention (transesterification method) includes the step of transesterification of polyvinyl acetate or a raw material vinyl alcohol-vinyl acetate copolymer using a dianionic zincate complex represented by the following formula (2).

The use of the dianionic zincate complex enables favorable production of a vinyl alcohol-vinyl acetate copolymer having a randomness value within a predetermined range. Moreover, the use of the dianionic zincate complex enables progress of the transesterification in a very short reaction time. Specifically, the reaction can proceed in a time roughly one-tenth of the time needed for transesterification using $CH_3ONa$.

$$t\text{-}Bu_nR_{4-n}ZnM_m \quad (2)$$

In the formula (2), n represents an integer of 1 to 4, m represents 1 or 2, Rs may be the same as or different from one another when n represents 1 or 2 and each represent a C1-C8 alkyl, alkenyl, aryl, or arylalkyl group, and M represents lithium or magnesium.

Specific examples of the C1-C8 alkyl, alkenyl, aryl, or arylalkyl group include methyl, ethyl, n-propyl, propyl, n-butyl, i-butyl, sec-butyl, t-butyl, n-pentyl, n-hexyl, vinyl, phenyl, and benzyl groups.

M represents lithium or magnesium. When M represents lithium, m represents 2. When M represents magnesium, m represents 1.

The dianionic zincate complex represented by the formula (2) is disclosed in JP 2004-292328 A and can be prepared by the method described in JP 2004-292328 A.

Specifically, examples of dilithium salts include dilithium tetra-t-butylzincate, dilithium tri-t-butyl methylzincate, dilithium tri-t-butyl ethylzincate, dilithium tri-t-butyl-n-propylzincate, dilithium tri-t-butyl-n-butylzincate, dilithium tri-t-butyl-i-butylzincate, dilithium tri-t-butyl-sec-butylzincate, dilithium di-t-butyl dimethylzincate, dilithium di-t-butyl diethylzincate, dilithium di-t-butyl di-n-propylzincate, dilithium di-t-butyl di-n-butylzincate, dilithium di-t-butyl di-i-butylzincate, dilithium di-t-butyl di-sec-butylzincate, dilithium t-butyl trimethylzincate, dilithium t-butyl triethylzincate, dilithium t-butyl tri-n-propylzincate, dilithium t-butyl tri-n-butylzincate, dilithium t-butyl tri-i-butylzincate, and dilithium t-butyl tri-sec-butylzincate.

Examples of magnesium salts include magnesium tetra-t-butylzincate, magnesium tri-t-butyl methylzincate, magnesium tri-t-butyl ethylzincate, magnesium tri-t-butyl-n-propylzincate, magnesium tri-t-butyl-n-butylzincate, magnesium tri-t-butyl-i-butylzincate, magnesium tri-t-butyl-sec-butylzincate, magnesium di-t-butyl dimethylzincate, magnesium di-t-butyl diethylzincate, magnesium di-t-butyl di-n-propylzincate, magnesium di-t-butyl di-n-butylzincate, magnesium di-t-butyl di-i-butylzincate, magnesium di-t-butyl di-sec-butylzincate, magnesium t-butyl trimethylzincate, magnesium t-butyl triethylzincate, magnesium t-butyl tri-n-propylzincate, magnesium t-butyl tri-n-butylzincate, magnesium t-butyl tri-i-butylzincate, and magnesium t-butyl tri-sec-butylzincate.

In particular, the dianionic zincate complex represented by the formula (2) is preferably a dilithium salt, and preferably has a C1-C4 alkyl group. Particularly preferred is dilithium tetra-t-butylzincate (TBZL).

The dianionic zincate complexes may be used alone or in combination of two or more thereof.

The TBZL can be prepared by the method described in Example 1 in JP 2004-292328 A.

The raw material used in the transesterification method may be polyvinyl acetate or a raw material vinyl alcohol-vinyl acetate copolymer.

In the case of using polyvinyl acetate, the vinyl alcohol-vinyl acetate copolymer of the present invention can be prepared in a short reaction time.

In the case of using a raw material vinyl alcohol-vinyl acetate copolymer, the vinyl alcohol-vinyl acetate copolymer of the present invention having a higher randomness value can be prepared.

Moreover, in the case of employing the transesterification method, after transesterification of polyvinyl acetate using a dianionic zincate complex represented by the formula (2), the resulting vinyl alcohol-vinyl acetate copolymer may be further transesterified using a dianionic zincate complex represented by the formula (2).

The raw material vinyl alcohol-vinyl acetate copolymer may be, as well as a conventional commercially available vinyl alcohol-vinyl acetate copolymer, a vinyl alcohol-vinyl acetate copolymer obtained by transesterification of polyvinyl acetate using a dianionic zincate complex.

The reaction temperature for the transesterification is not particularly limited, and may be set as appropriate within a range of −80° C. to 200° C. The reaction temperature is within a range of preferably −80° C. to 80° C., more preferably −50° C. to 50° C. The dianionic zincate complex is effective as a reaction catalyst at low temperature and is particularly effective when used in a temperature range of not higher than 50° C.

The transesterification may be performed at a normal pressure or a reduced pressure.

The reaction time of the transesterification may be adjusted such that the transesterification is completed.

Moreover, at the time of the transesterification, a by-product alcohol can be removed by azeotropy with an organic solvent.

In the transesterification, the lower limit of the amount of a dianionic zincate catalyst is preferably 0.001 mol and the upper limit thereof is 0.5 mol, per 1 mol of the polyvinyl acetate. The lower limit is more preferably 0.001 mol and the upper limit is more preferably 0.1 mol. The lower limit is still more preferably 0.005 mol and the upper limit is still more preferably 0.05 mol.

In the transesterification of polyvinyl acetate using the dianionic zincate complex, a preferred method includes, for example, dissolving polyvinyl acetate in a solvent, adding the dianionic zincate complex to the solution for carrying out transesterification, and further adding an acid to terminate the transesterification.

The solvent is not particularly limited, and examples thereof include methanol, toluene, dimethyl sulfoxide, ethanol, acetone, diethyl ether, tetrahydrofuran, water, and solvent mixtures containing these.

The transesterification may be performed in a homogeneous system or a heterogeneous system.

The homogeneous system is a system in which a substance is present at a homogeneous concentration, referring to a state where components are dissolved in a solvent. The heterogeneous system is a heterogeneous reaction system in which a substance is localized along with the progress of the reaction, referring to a state where some components such as resin are not dissolved during the progress of the reaction.

The transesterification carried out in a homogeneous system enables production of a vinyl alcohol-vinyl acetate copolymer in which a group of vinyl alcohol-centered triads has a random structure and a group of vinyl acetate-centered triads has a block structure.

The transesterification carried out in a heterogeneous system enables production of a vinyl alcohol-vinyl acetate copolymer in which a group of vinyl alcohol-centered triads has a block structure and a group of vinyl acetate-centered triads has a random structure.

As an exemplary method for reacetylating the polyvinyl alcohol, the polyvinyl alcohol may be added to a solvent containing acetic acid to be reacted.

The vinyl alcohol-vinyl acetate copolymer of the present invention may be used for applications such as raw materials of viscosity modifiers for aqueous solutions, gas barrier coating agents, suspending agents, emulsifiers, polarizers, water-soluble films, dispersants, and various resins.

Advantageous Effects of Invention

The present invention can provide a vinyl alcohol-vinyl acetate copolymer having excellent solubility and a method for producing a vinyl alcohol-vinyl acetate copolymer.

DESCRIPTION OF EMBODIMENTS

Embodiments of the present invention are more specifically described with reference to, but not limited to, the following examples.

Example 1

An amount of 0.5 g (5.8 mmol) of polyvinyl acetate was dissolved in 22.5 mL of dimethyl sulfoxide (DMSO), and to the solution was added 2.5 mL of methanol and then 0.15 mL (1.5 mol %) of dilithium tetra-t-butylzincate (TBZL) as a catalyst.

The mixture was stirred at 30° C. for five minutes, and hydrochloric acid was added thereto to terminate the reaction. Then, the resulting mixture was subjected to dialysis using acetone and concentration, thereby obtaining a product material (vinyl alcohol-vinyl acetate copolymer).

Example 2

An amount of 0.5 g (5.8 mmol) of polyvinyl acetate was dissolved in 25 mL of methanol, and to the solution was added 0.38 mL (2.5 mol %) of dilithium tetra-t-butylzincate (TBZL) as a catalyst.

The mixture was stirred at 30° C. for 45 minutes, and hydrochloric acid was added thereto to terminate the reaction. Then, the resulting mixture was subjected to dialysis using acetone and concentration, thereby obtaining a product material (vinyl alcohol-vinyl acetate copolymer).

Example 3

An amount of 0.5026 g (11.4 mmol) of polyvinyl alcohol [degree of saponification: >99 mol %] was dissolved in a solvent mixture of acetic acid and water (acetic acid:water=5:5) to prepare 10.5 g of a 5% by weight solution of polyvinyl alcohol.

The obtained polyvinyl alcohol solution was stirred at 100° C. for 24 hours and subjected to reprecipitation using acetone, thereby obtaining a product material (reacetylation).

The obtained product material was subjected to similar operation (reacetylation) using a solvent mixture of acetic acid and water (acetic acid:water=7:3) and then using a solvent mixture of acetic acid and water (acetic acid:water=9:1), thereby obtaining a product material. After the reacetylation using a solvent mixture of acetic acid and water (acetic acid:water=9:1), concentration was carried out to recover a product material (vinyl alcohol-vinyl acetate copolymer).

Example 4

A product material (vinyl alcohol-vinyl acetate copolymer) was obtained as in Example 1, except that the stirring time (reaction time) was changed to 10 minutes.

Example 5

A product material (vinyl alcohol-vinyl acetate copolymer) was obtained as in Example 2, except that the stirring time (reaction time) was changed to 90 minutes.

Example 6

The vinyl alcohol-vinyl acetate copolymer obtained in Example 4 was dissolved in DMSO to a concentration of 2% by weight, and to the solution was added 5 mol % of dilithium tetra-t-butylzincate (TBZL). The mixture was stirred at 30° C. for 24 hours so that transesterification was carried out. The resulting mixture was then subjected to dialysis using acetone and concentration, thereby obtaining a product material (vinyl alcohol-vinyl acetate copolymer).

Example 7

A product material (vinyl alcohol-vinyl acetate copolymer) was obtained as in Example 6, except that the raw material used was the vinyl alcohol-vinyl acetate copolymer obtained in Example 5.

Example 8

A product material (vinyl alcohol-vinyl acetate copolymer) was obtained as in Example 4, except that the stirring time (reaction time) was changed to 15 minutes.

Example 9

A product material (vinyl alcohol-vinyl acetate copolymer) was obtained as in Example 5, except that the stirring time (reaction time) was changed to 180 minutes.

Example 10

An amount of 0.5 g (5.8 mmol) of polyvinyl acetate was dissolved in a mixture of 35.4 mL of dimethyl sulfoxide (DMSO) and 8.9 mL of water, and to the solution was added 0.21 g (5.1 mmol) of NaOH. After stirring at 60° C. for 120 minutes, the mixture was subjected to dialysis using methanol and concentration, thereby obtaining a product material (vinyl alcohol-vinyl acetate copolymer).

The obtained vinyl alcohol-vinyl acetate copolymer was dissolved in DMSO to a concentration of 2% by weight, and to the solution was added 5 mol % of dilithium tetra-t-butylzincate (TBZL). The mixture was stirred at 30° C. for 24 hours so that transesterification was carried out. Then, the resulting mixture was subjected to dialysis using acetone and concentration, thereby obtaining a product material (vinyl alcohol-vinyl acetate copolymer).

Example 11

A product material (vinyl alcohol-vinyl acetate copolymer) was obtained as in Example 10, except that the amount of NaOH was changed to 0.16 g (3.9 mmol).

Comparative Example 1

An amount of 0.5 g (5.8 mmol) of polyvinyl acetate was dissolved in a mixture of 35.4 mL of acetone and 8.9 mL of water, and to the solution was added 0.12 g (2.9 mmol) of NaOH.

The mixture was stirred at 60° C. for 120 minutes and then subjected to concentration using an evaporator, thereby obtaining a product material (vinyl alcohol-vinyl acetate copolymer).

Comparative Example 2

An amount of 0.5 g (5.8 mmol) of polyvinyl acetate was dissolved in 22.5 mL of DMSO (dimethyl sulfoxide), and to the solution was added 2.5 mL of methanol and then 4.8 mg (1.5 mol %) of $CH_3ONa$ as a catalyst.

The mixture was stirred at 30° C. for 80 minutes, and an excessive amount of acetic acid was added thereto to terminate the reaction. The resulting mixture was then subjected to dialysis using acetone and concentration, thereby obtaining a product material (vinyl alcohol-vinyl acetate copolymer).

Comparative Example 3

An amount of 0.5 g (5.8 mmol) of polyvinyl acetate was dissolved in 25 mL of methanol, and to the solution was added 8.6 mg (2.5 mol %) of $CH_3ONa$ as a catalyst.

The mixture was stirred at 30° C. for 17 hours, and an excessive amount of acetic acid was added thereto to terminate the reaction. The resulting mixture was then subjected to dialysis using acetone and concentration, thereby obtaining a product material (vinyl alcohol-vinyl acetate copolymer).

Comparative Example 4

An amount of 0.5 g (5.8 mmol) of polyvinyl acetate was dissolved in a mixture of 35.4 mL of DMSO (dimethyl sulfoxide) and 8.9 mL of water, and to the solution was added 0.12 g (2.9 mmol) of NaOH.

The mixture was stirred at 60° C. for 120 minutes and then subjected to dialysis using methanol and concentration, thereby obtaining a product material (vinyl alcohol-vinyl acetate copolymer).

(Evaluation Method)

The product materials obtained above were evaluated by the following methods. Table 1 shows the results.

($^1$H-NMR Analysis)

Each obtained product material was subjected to $^1$H-NMR analysis for determination of the composition ratio (VOH: vinyl alcohol, Vac:vinyl acetate) thereof.

In addition, the triad content ratio between the vinyl alcohol-centered triads (AOA, AOO, and OOO) and the vinyl acetate-centered triads (AAA, AAO, OAO) was measured. It is to be noted that "AOO" and "OOA" are both represented as "AOO", and "AAO" and "OAA" are both represented as "AAO".

Moreover, the mean chain lengths and randomness values of the unit of vinyl alcohol and the unit of vinyl acetate were calculated.

(Evaluation on Gel Formation Temperature)

Each obtained product material was dissolved in a solvent mixture of water and THF (water/THF=3/7) to prepare a 0.1% by weight solution. The obtained solution was put in a sample bottle and warmed on a hotplate from room temperature to 60° C. Then, the temperature was further gradually increased, and the temperature at which clouding of the solution was visually observed was determined as a gel formation temperature.

Direct saponification as in Comparative Example 4 was carried out in which the amount of NaOH was changed. Based on the result, a calibration curve (gelling temperature line) indicating a relation between the composition ratio of VOH and Vac and the gel formation temperature was constructed. The obtained gelling temperature line was represented by the following equation.

$$\text{Gel formation temperature (° C.)}=0.2759\times VOH \text{ composition ratio (mol \%)}+56.057$$

Next, the difference between the gel formation temperature obtained in each of the examples and comparative examples and the gel formation temperature at the same composition ratio as above determined from the constructed gelling temperature line (control gel formation temperature) was evaluated based on the following criteria.

oo (Excellent): The obtained gel formation temperature is higher than the control gel formation temperature by 3° C. or more.

o (Good): The obtained gel formation temperature is higher than the control gel formation temperature by 1° C. or more but less than 3° C.

x (Poor): The difference between the obtained gel formation temperature and the control gel formation temperature is less than 1° C.

(Lower Critical Solution Temperature Property)

Each obtained product material was dissolved in a solvent mixture of water and THF (water/THF=3/7) to prepare a 0.1% by weight solution. The obtained solution was put in a Peltier temperature control cell (optical path length: 10 mm), and the temperature was increased and decreased three times within a temperature range from 60° C. to 100° C. at 2° C./min, during which transmittance of light at a wavelength of 500 nm was continuously measured using a spectrophotometer (V550 type available from Jasco Corp.).

Assuming that the transmittance at 60° C. is 100%, the average of the temperatures at which the transmittance at 60° C. dropped to 50% or lower for the second and the third times was taken as the lower critical solution temperature.

Direct saponification as in Comparative Example 4 was carried out, while the amount of NaOH was changed. Based on the result, a calibration curve (lower critical solution temperature curve) indicating a relation between the composition ratio of VOH and Vac and the lower critical solution temperature was constructed. The obtained lower critical solution temperature curve was indicated by the following equation.

$$\text{Critical solution temperature (° C.)}=58.332\times e^{(0.0036\times VOH \text{ composition ratio (mol \%)})}$$

Next, the difference between the lower critical solution temperature obtained in each of the examples and comparative examples and the lower critical solution temperature in the case of the same composition obtained from the constructed lower critical solution temperature curve (control lower critical solution temperature) was evaluated based on the following criteria.

oo (Excellent): The lower critical solution temperature is higher than the control lower critical solution temperature by 3° C. or more.

o (Good): The lower critical solution temperature is higher than the control lower critical solution temperature by 1° C. or more but less than 3° C.

x (Poor): The difference between the lower critical solution temperature and the control lower critical solution temperature is less than 1° C.

TABLE 1

| | Preparation method | | | | Composition ratio (mol %) | | Triad content ratio (mol %) | | |
|---|---|---|---|---|---|---|---|---|---|
| | Raw material | Additive | Reaction system | Reaction method | VOH | Vac | AOA | AOO | OOO |
| Example 1 | Polyvinyl acetate | TBZL | Homogenious | Transesterification | 51.0 | 49.0 | 6.6 | 14.7 | 16.3 |
| Example 2 | Polyvinyl acetate | TBZL | Heterogenious | Transesterification | 46.0 | 54.0 | 5.4 | 11.6 | 32.7 |
| Example 3 | Polyvinyl alcohol | Acetic acid | Homogenious | Reacetylation | 47.3 | 52.7 | 9.1 | 19.5 | 18.7 |
| Example 4 | Polyvinyl acetate | TBZL | Homogenious | Transesterification | 88.5 | 11.5 | 3.7 | 2.9 | 4.9 |
| Example 5 | Polyvinyl acetate | TBZL | Heterogenious | Transesterification | 87.0 | 13.0 | 4.5 | 3.2 | 5.3 |
| Example 6 | VOH-Vac copolymer | TBZL | Homogenious | Intramolecular transesterification | 90.9 | 9.1 | 7.3 | 1.5 | 0.0 |
| Example 7 | VOH-Vac copolymer | TBZL | Homogenious | Intramolecular transesterification | 91.6 | 8.4 | 6.8 | 1.3 | 0.3 |
| Example 8 | Polyvinyl acetate | TBZL | Homogenious | Transesterification | 90.5 | 9.5 | 2.4 | 3.8 | 3.4 |
| Example 9 | Polyvinyl acetate | TBZL | Heterogenious | Transesterification | 93.9 | 6.1 | 2.7 | 1.5 | 1.9 |
| Example 10 | VOH-Vac copolymer | TBZL | Homogenious | Intramolecular transesterification | 88.7 | 11.3 | 7.4 | 3.9 | 0.0 |
| Example 11 | VOH-Vac copolymer | TBZL | Homogenious | Intramolecular transesterification | 66.4 | 33.6 | 19.0 | 12.7 | 1.9 |
| Comparative Example 1 | Polyvinyl acetate | NaOH | Heterogenious | Direct saponification | 50.0 | 50.0 | 6.1 | 5.6 | 39.3 |
| Comparative Example 2 | Polyvinyl acetate | $CH_3ONa$ | Homogenious | Transesterification | 49.0 | 51.0 | 4.3 | 9.4 | 16 |
| Comparative Example 3 | Polyvinyl acetate | $CH_3ONa$ | Heterogenious | Transesterification | 46.0 | 54.0 | 4.3 | 7.6 | 45.4 |
| Comparative Example 4 | Polyvinyl acetate | NaOH | Homogenious | Direct saponification | 50.0 | 50.0 | 3.1 | 8.2 | 40.6 |

| | Triad content ratio (mol %) | | | OOO content ratio*1 | AAA content ratio*2 | mean chain length | | Randomness value R | Acetyl chain ratio | Evaluation | |
|---|---|---|---|---|---|---|---|---|---|---|---|
| | | | | | | | | | | Gel formation temperature | Lower critical solution temperature property |
| | AAA | AAO | OAO | | | $L_O$ | $L_A$ | | | | |
| Example 1 | 45.7 | 17.3 | 4.7 | 43.4% | 67.5% | 2.7 | 5.1 | 0.57 | 2.48 | ◯ | ◯◯ |
| Example 2 | 18.4 | 20.1 | 11.8 | 65.8% | 36.6% | 4.4 | 2.3 | 0.66 | 1.24 | ◯ | ◯◯ |
| Example 3 | 7.4 | 26.4 | 18.7 | 39.5% | 14.1% | 2.5 | 1.6 | 1.01 | 0.87 | ◯ | ◯◯ |
| Example 4 | 81.7 | 4.1 | 2.7 | 42.6% | 92.3% | 18.6 | 2.2 | 0.50 | 0.26 | ◯ | ◯ |
| Example 5 | 81.5 | 3.5 | 2.0 | 40.8% | 93.7% | 23.2 | 2.1 | 0.51 | 0.28 | ◯ | ◯ |
| Example 6 | 83.1 | 5.9 | 1.9 | 0.0% | 91.4% | 18.7 | 1.1 | 0.97 | 0.10 | ◯◯ | ◯◯ |
| Example 7 | 86 | 4.5 | 1.2 | 3.6% | 93.8% | 26.6 | 1.1 | 0.92 | 0.09 | ◯◯ | ◯◯ |
| Example 8 | 81.1 | 4.3 | 5.1 | 35.4% | 89.6% | 12.5 | 2.2 | 0.53 | 0.21 | ◯ | ◯ |
| Example 9 | 88.2 | 3.4 | 2.4 | 31.1% | 93.8% | 22.9 | 1.8 | 0.61 | 0.11 | ◯◯ | ◯ |
| Example 10 | 76.1 | 11 | 1.6 | 0.0% | 85.8% | 12.5 | 1.2 | 0.91 | 0.14 | ◯◯ | ◯◯ |
| Example 11 | 50.5 | 13.7 | 2.2 | 5.7% | 76.1% | 7.3 | 1.3 | 0.89 | 0.45 | ◯◯ | ◯◯ |
| Comparative Example 1 | 35.1 | 9 | 4.9 | 77.1% | 71.6% | 5.7 | 5.2 | 0.37 | 2.61 | x | x |
| Comparative Example 2 | 55.3 | 12.1 | 2.8 | 53.9% | 78.8% | 3.3 | 7.9 | 0.43 | 4.05 | x | x |
| Comparative Example 3 | 29.8 | 9.9 | 2.9 | 79.2% | 70.0% | 7.1 | 5.4 | 0.33 | 2.93 | x | x |
| Comparative Example 4 | 34.3 | 10.3 | 3.5 | 78.2% | 71.3% | 7.2 | 5.6 | 0.32 | 2.78 | x | x |

*1 Proportion of OOO in the total of AOA, AOO, and OOO
*2 Proportion of AAA in the total of AAA, AAO, and OAO

INDUSTRIAL APPLICABILITY

The present invention can provide a vinyl alcohol-vinyl acetate copolymer having excellent solubility and a method for producing a vinyl alcohol-vinyl acetate copolymer.

The invention claimed is:

1. A method for producing a vinyl alcohol-vinyl acetate copolymer comprising a unit of vinyl alcohol and a unit of vinyl acetate, wherein the vinyl alcohol-vinyl acetate copolymer has a randomness value R of 0.5 or higher, and wherein the randomness value R is obtained using the following equation (1):

$$R = \frac{1}{L_A} + \frac{1}{L_O} \quad (1)$$

where $L_O$ represents a mean chain length of the unit of vinyl alcohol and $L_A$ represents a mean chain length of the unit of vinyl acetate, the method comprising the step of:
transesterification of polyvinyl acetate or a raw material vinyl alcohol-vinyl acetate copolymer using a dianionic zincate complex represented by the following formula (2):

$$t\text{-}Bu_nR_{4-n}ZnM_m \quad (2)$$

where n represents an integer of 1 to 4, m represents 1 or 2, Rs may be the same as or different from one another when n represents 1 or 2 and each represent a C1-C8 alkyl, alkenyl, aryl, or arylalkyl group, and M represents lithium or magnesium.

2. The method for producing the vinyl alcohol-vinyl acetate copolymer according to claim 1,
wherein the dianionic zincate complex is dilithium tetra-t-butylzincate.

3. The method for producing the vinyl alcohol-vinyl acetate copolymer according to claim 1,
wherein the transesterification is performed in a homogeneous system.

4. The method for producing the vinyl alcohol-vinyl acetate copolymer according to claim 1,
wherein the transesterification is performed in a heterogeneous system.

5. The method for producing the vinyl alcohol-vinyl acetate copolymer according to claim 1,
wherein the vinyl alcohol-vinyl acetate copolymer has a mean chain length $L_O$ of the unit of vinyl alcohol of 1 or longer.

6. The method for producing the vinyl alcohol-vinyl acetate copolymer according to claim 1,
wherein the vinyl alcohol-vinyl acetate copolymer has a mean chain length $L_A$ of the unit of vinyl acetate of 1 or longer.

7. The method for producing the vinyl alcohol-vinyl acetate copolymer according to claim 1,
wherein the vinyl alcohol-vinyl acetate copolymer comprises the unit of vinyl alcohol in an amount of 0.2 to 99.8 mol %.

8. The method for producing the vinyl alcohol-vinyl acetate copolymer according to claim 2,
wherein the vinyl alcohol-vinyl acetate copolymer has a mean chain length $L_O$ of the unit of vinyl alcohol of 1 or longer.

9. The method for producing the vinyl alcohol-vinyl acetate copolymer according to claim 2,
wherein the vinyl alcohol-vinyl acetate copolymer has a mean chain length $L_A$ of the unit of vinyl acetate of 1 or longer.

10. The method for producing the vinyl alcohol-vinyl acetate copolymer according to claim 2,
wherein the vinyl alcohol-vinyl acetate copolymer comprises the unit of vinyl alcohol in an amount of 0.2 to 99.8 mol %.

* * * * *